United States Patent
Ohuchi et al.

(10) Patent No.: US 7,709,982 B2
(45) Date of Patent: May 4, 2010

(54) BRUSHLESS MOTOR

(75) Inventors: Takuya Ohuchi, Watari-gun (JP);
Shigeo Omori, Utsunomiya (JP);
Hiroshi Oyama, Iwanuma (JP);
Katsuhiro Uchimura, Shibata-gun (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 12/180,053

(22) Filed: Jul. 25, 2008

(65) Prior Publication Data
US 2009/0026860 A1    Jan. 29, 2009

(30) Foreign Application Priority Data
Jul. 26, 2007    (JP)    ............... 2007-194338

(51) Int. Cl.
*H02K 7/00*    (2006.01)
(52) U.S. Cl. ...................................... 310/71
(58) Field of Classification Search .................... 310/71, 310/68 B, 156.14, 156.19
See application file for complete search history.

(56) References Cited
U.S. PATENT DOCUMENTS
6,388,353 B1 *    5/2002    Liu et al. ............... 310/156.09
6,600,244 B2 *    7/2003    Okazaki et al. ............... 310/71
6,707,185 B2 *    3/2004    Akutsu et al. ............... 310/71
7,193,345 B2 *    3/2007    Shinzaki et al. ............... 310/71

FOREIGN PATENT DOCUMENTS

| JP | 07-022722 | 1/1995 |
|---|---|---|
| JP | 08-023653 | 1/1996 |
| JP | 11-018345 | 1/1999 |
| JP | 11-299159 | 10/1999 |
| JP | 2001-309618 | 11/2001 |
| JP | 2007-049774 | 2/2007 |

* cited by examiner

*Primary Examiner*—Dang D Le
(74) *Attorney, Agent, or Firm*—Lahive & Cockfield, LLP; Anthony A. Laurentano

(57) ABSTRACT

A brushless motor has a first coupler that includes a molded body with an annular member and a plug integrally combined with a peripheral side wall of the annular member. The plug houses terminal rods therein. Bridges project radially inward from an inner peripheral wall surface of the annular member. Connectors joined to respective leads that extend from an electromagnetic coil are mounted on radial inner ends of the bridges. The bridges axe provided in pairs of adjacent bridges. In each of such pairs, the bridges project in parallel with each other from an inner peripheral wall surface of the annular member.

7 Claims, 12 Drawing Sheets

BRUSHLESS MOTOR

BACKGROUND OF THE INVENTION

1. Field of the Invention

The present invention relates to a brushless motor having magnets that rotate in an electromagnetic coil to generate power.

2. Description of the Related Art

In recent years, brushless motors have increasingly been combined with automotive internal combustion engines. One known type of brushless motor, which has been applied and used in this manner, includes a cylindrical electromagnetic coil securely positioned inside a casing together with magnets, which are rotatably disposed in the cylindrical electromagnetic coil.

Leads extend from the electromagnetic coil and are connected to respective connectors projecting from a coupler. The connectors are electrically connected to three terminals whose inside and outside diameters are different from each other. Terminal rods, which extend from the terminals, provide respective contacts in three phases, i.e., U, V, and W phases. The connectors thus serve as electrical contacts associated with the U, V, and W phases, respectively.

As disclosed in Japanese Laid-Open Patent Publication No. 08-023653, connectors usually project outwardly from the coupler. If the connectors and the terminal rods are of the same height, then the connectors interfere with the terminal rods. Therefore, the terminal rods need to be different in height from the connectors.

One problem that occurs when the terminal rods and the connectors have different heights is that the coupler has an increased height dimension. Accordingly, it has been difficult to reduce the size of conventional brushless motors.

SUMMARY OF THE INVENTION

It is a general object of the present invention to provide a brushless motor with a coupler that has a reduced vertical dimension.

A major object of the present invention is to provide a brushless motor, which is small in size.

Another object of the present invention is to provide a brushless motor, which has a low power requirement and a high response speed.

Still another object of the present invention is to provide a brushless motor, which can be used stably over a long period of time.

According to an aspect of the present invention, there is provided a brushless motor comprising a shaft, a magnet held on the shaft, an electromagnetic coil surrounding the magnet and including a plurality of leads, and a coupler having a plurality of connectors joining the leads, wherein the coupler comprises an annular member and a plug coupled to the annular member and surrounding terminal rods, and further wherein the connectors are mounted on respective bridges that project radially inwardly from an inner wall surface of the annular member and are connected to the terminal rods.

The brushless motor includes connectors that project radially inwardly of the coupler, in contrast to connectors that project radially outwardly from the coupler. The connectors and the terminal rods, and hence the annular member and the plug, can be of the same height. The height dimension of the coupler can therefore be reduced, and the brushless motor can be reduced in size.

Preferably, the bridges are provided as pairs of adjacent bridges, wherein the adjacent bridges in each of the pairs extend parallel to each other. With this structure, the number of times that the leads have their angle changed is reduced when the connectors and the leads are joined to each other, with the result that the tact time required to produce the brushless motor can be shortened.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A brushless motor according to a preferred embodiment of the present invention, for use on an internal combustion engine in an automobile, will be described below with reference to the accompanying drawings.

Figure 1:
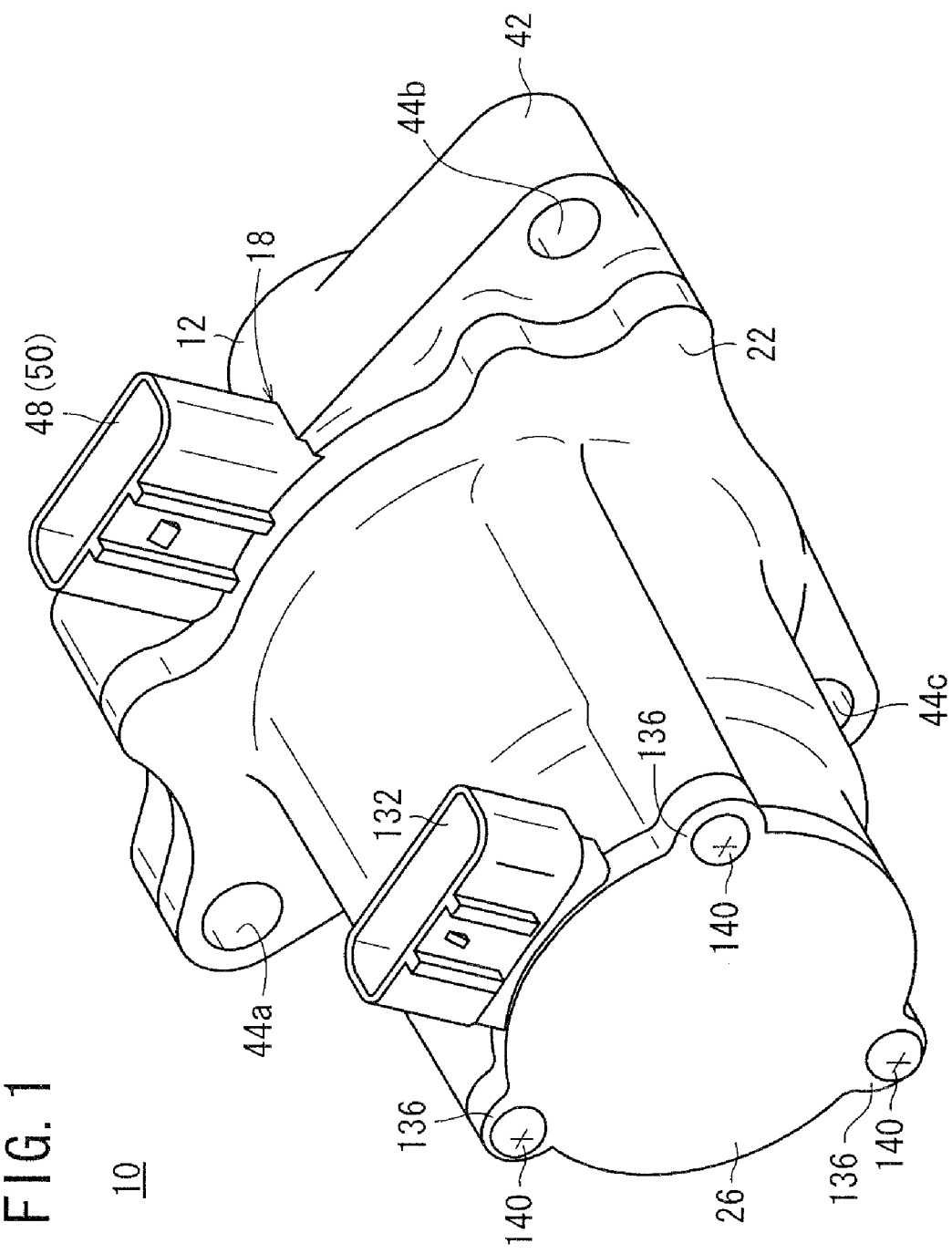
FIG. 1 is a perspective view of a brushless motor according to an embodiment of the present invention.
Figure 2:
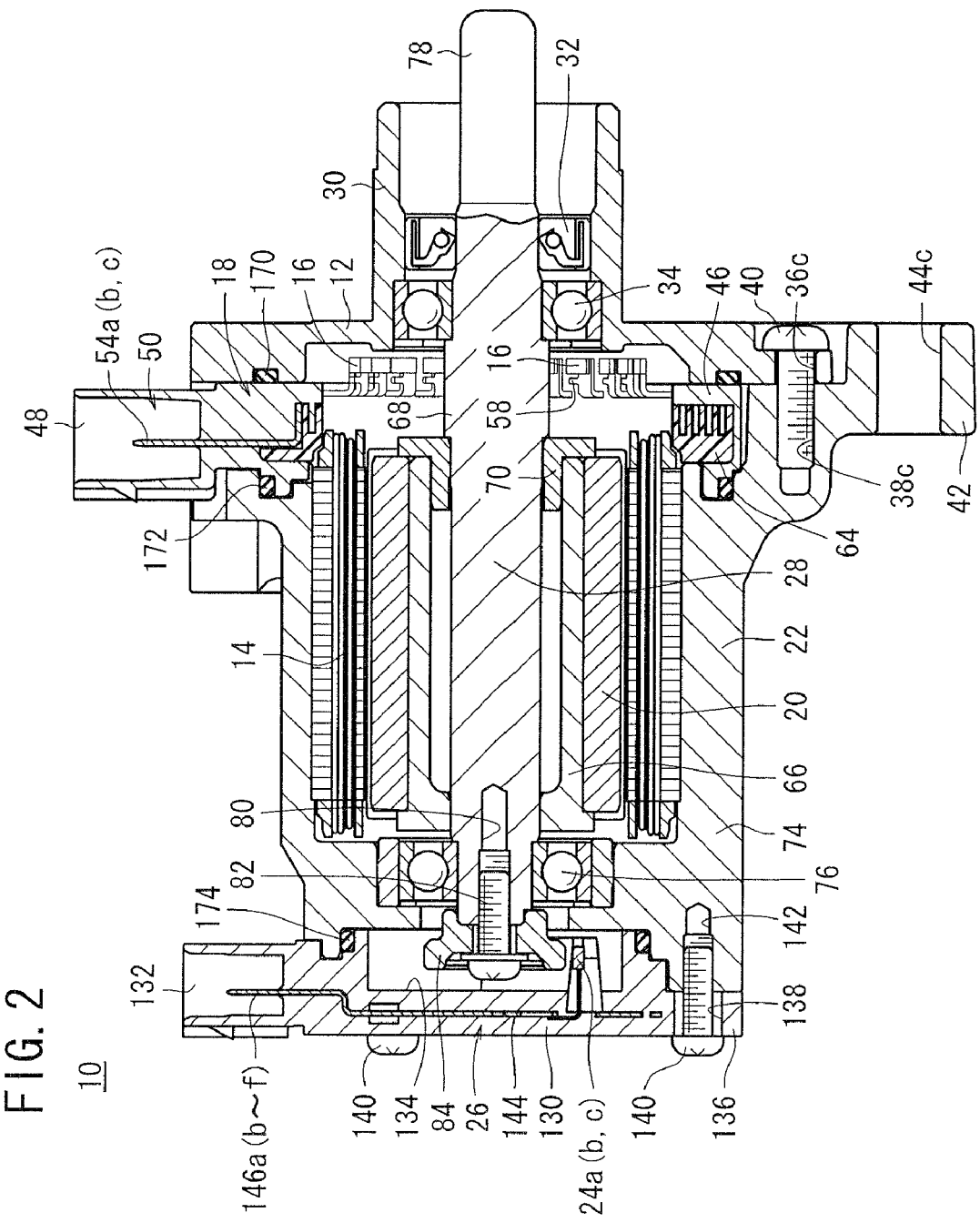
FIG. 2 is a vertical sectional side elevational view of the brushless motor shown in FIG. 1.
Figure 3:
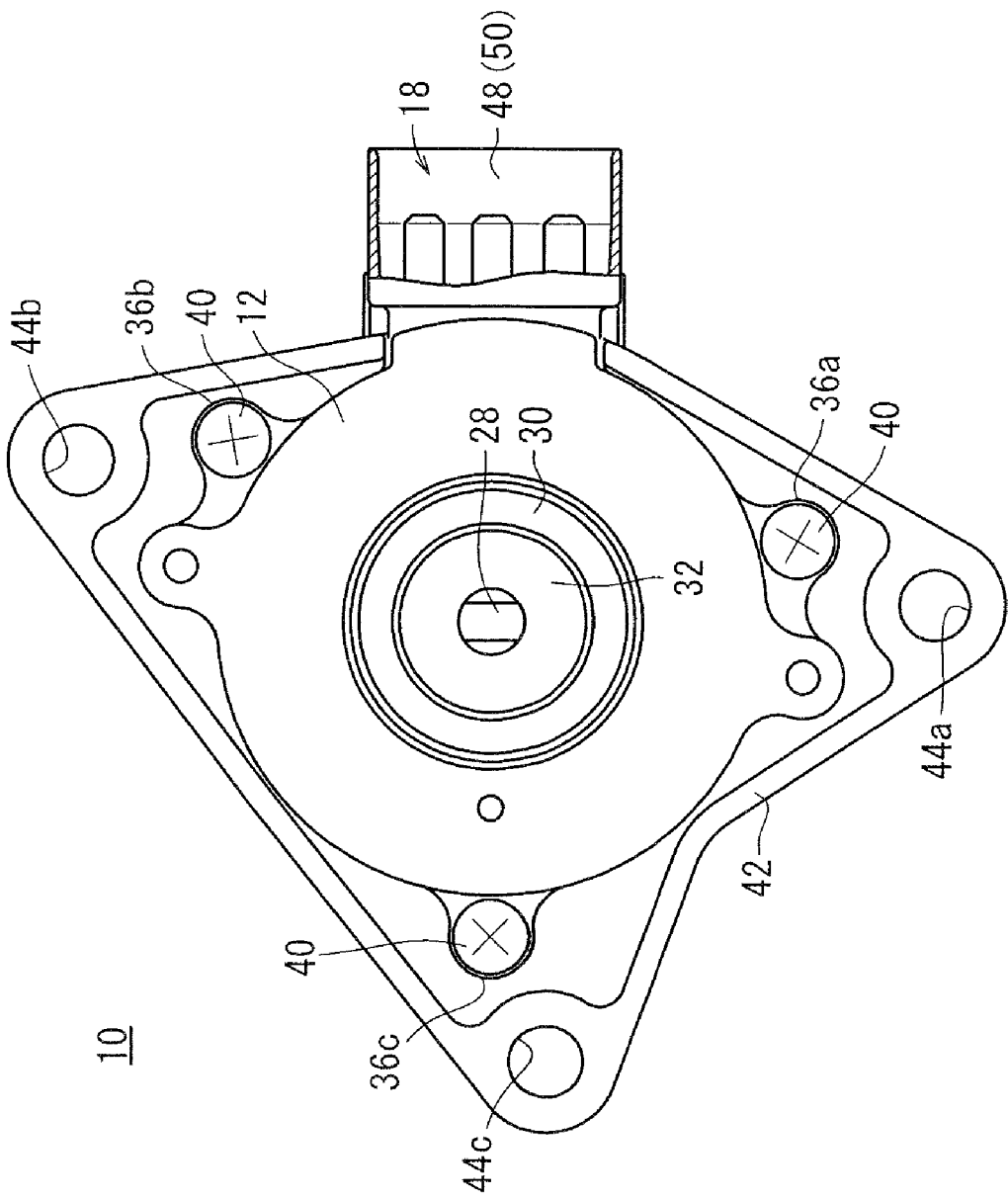
FIG. 3 is a rear elevational view of the brushless motor shown in FIG. 1.

FIGS. 1 through 3 are perspective, vertical sectional side elevational, and rear elevational views, respectively, of the brushless motor, generally denoted by 10, according to the preferred embodiment of the present invention. The brushless motor 10 comprises a holder base 12 that is coupled to the cylinder head of an internal combustion engine, a first coupler 18 having connectors 16 electrically connected to an electromagnetic coil 14 (see FIG. 2), a casing 22 housing the electromagnetic coil 14 and a main magnet 20 therein, and a second coupler 26 closing an open end of the casing 22 and accommodating three Hall ICs 24a through 24c (pole position detecting elements), which are securely positioned in the second coupler 26. A shaft 28 is centrally inserted axially inside the holder base 12, the first coupler 18, and the casing 22, and extends from the holder base 12 to the distal end of the casing 22.

The holder base 12 has a hollow cup 30 that projects substantially centrally from an end face thereof, which faces the cylinder head. The shaft 28 has an end portion inserted in the hollow cup 30, with an oil seal 32 and a first bearing 34 interposed between the shaft 28 and an inner wall surface of the hollow cup 30. The end portion of the shaft 28 is supported rotatably inside the holder base 12 by the first bearing 34. The oil seal 32 and the first bearing 34 are arranged in that order in a direction leading away from the cylinder head.

The holder base 12 also has three screw holes 36*a* through 36*c* (see FIG. 3) defined therein at spaced angular intervals around the shaft 28. The casing 22 also has three threaded holes 38*a* through 38*c* (see FIG. 2). The holder base 12 and the casing 22 are fastened to each other by screws 40, which are threaded through the screw holes 36*a* through 36*c* into the threaded holes 38*a* through 38*c*. As shown in FIGS. 2 and 3, the screws 40 have respective heads facing the cylinder head and positioned in respective recesses defined in the end face of the holder base 12.

As shown in FIGS. 1 and 3, the holder base 12 includes three substantially triangular wings 42 projecting outwardly and having respective through holes 44*a* through 44*c* defined therein in the vicinity of round corners thereof.

Figure 4:
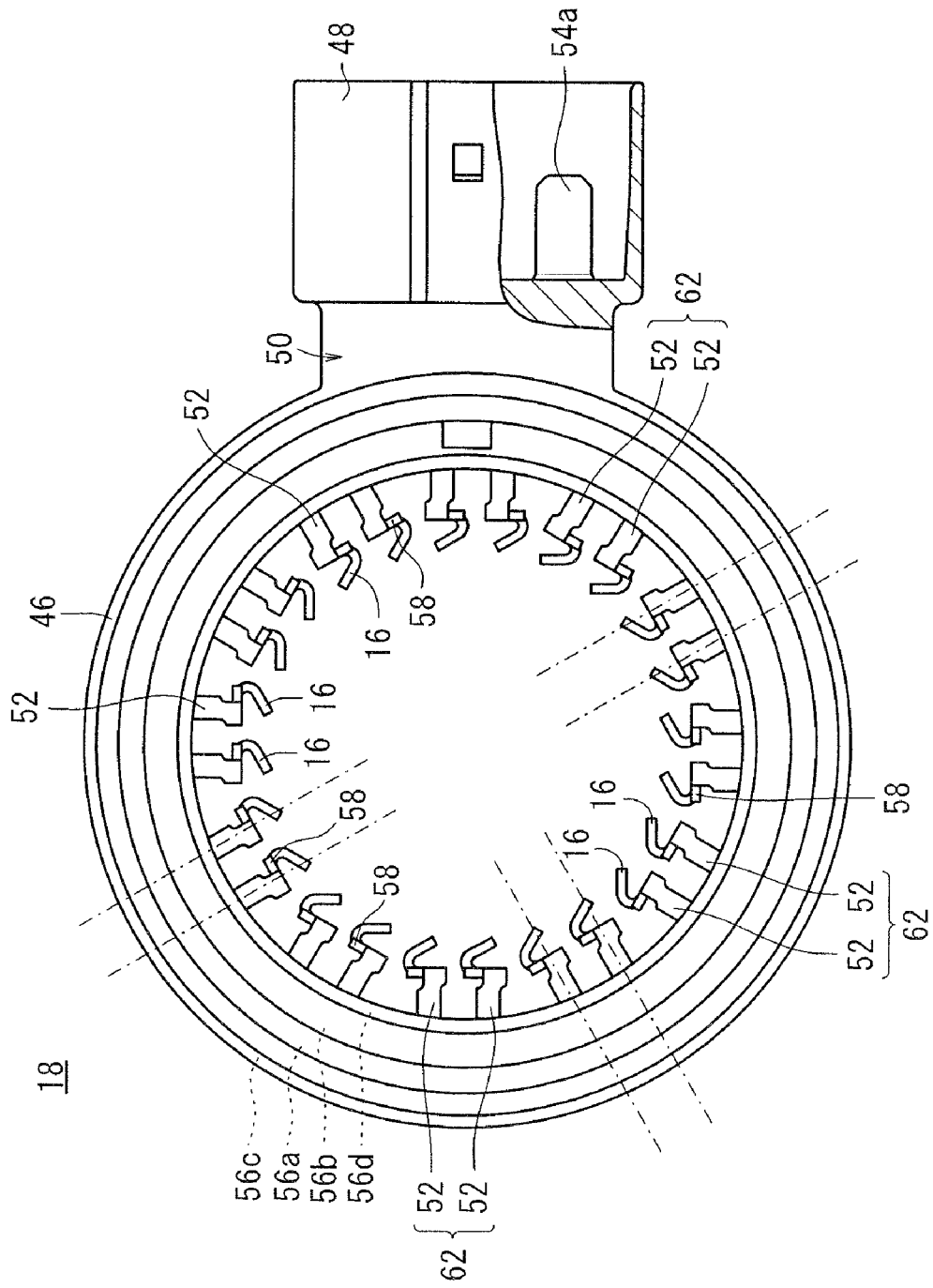
FIG. 4 is a plan view of a first coupler of the brushless motor shown in FIG. 1.

As shown in FIG. 4, the first coupler 18 comprises a molded body 50 including an annular member 46 and a plug 48 that projects radially outwardly from and is combined integrally with an outer peripheral side wall of the annular member 46. The first coupler 18 also includes a plurality of bridges 52, which project radially inwardly from an inner peripheral side wall of the annular member 46. There are a total of twenty-four connectors 16 mounted respectively on radial inner ends of the bridges 52.

General brushless motors include connectors therein, which project radially outwardly from the coupler. In contrast thereto, according to the present embodiment, the connectors 16 of the first coupler 18 project radially inwardly. Stated otherwise, the brushless motor 10 does not have any connectors that project radially outwardly from the annular member 46. As a result, only the plug 48 is allowed to project radially outwardly from the annular member 46. Since the plug 48 and the annular member 46 are of the same height (see FIG. 2), the first coupler 18 may have a smaller height dimension than in the case of a conventional coupler, in which the plug needs to have a sufficient height so as not to interfere with the radially outwardly projecting connectors. Consequently, the brushless motor 10 may be reduced in size.

The connectors 16 project slightly in the height dimension from the end face of the annular member 46. As shown in FIG. 2, the first coupler 18 is mounted in the casing 22 such that the connectors 16 become inserted into an open end of the holder base 12.

Figure 5:
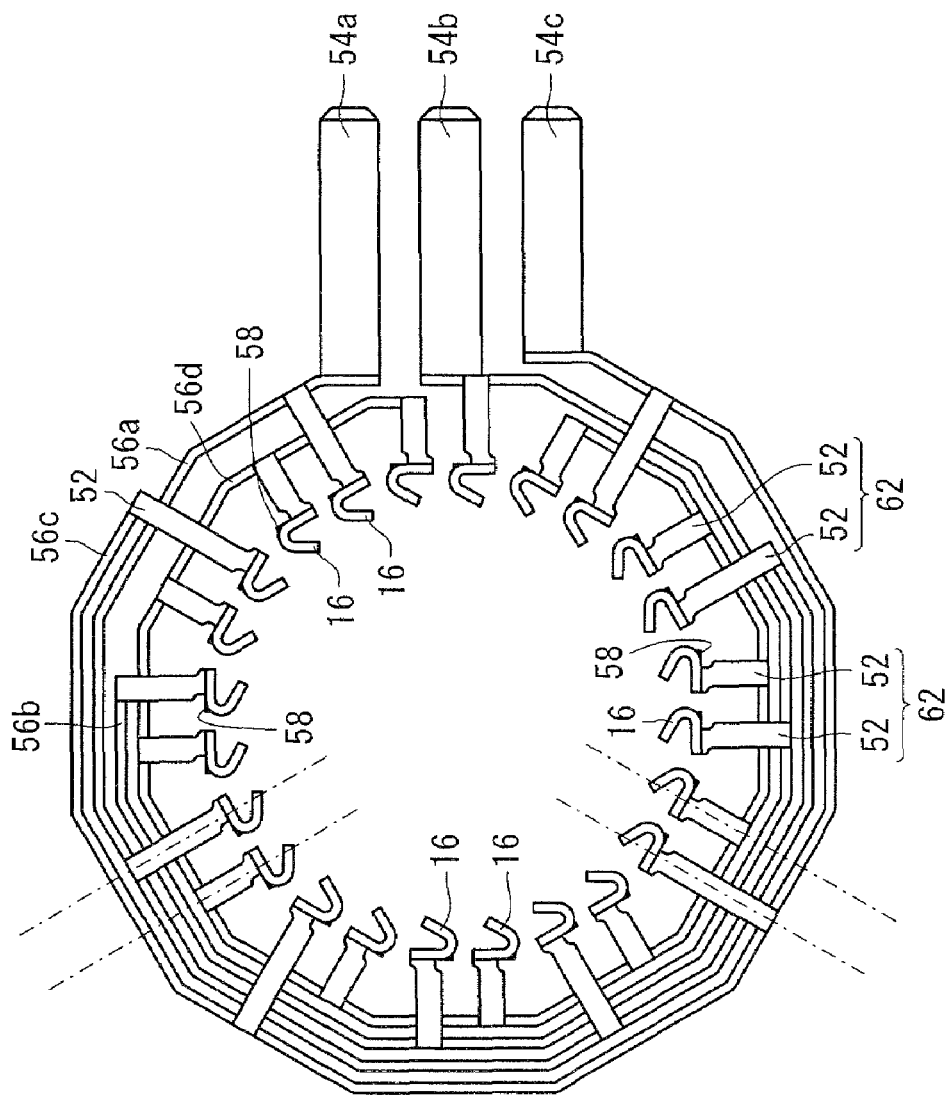
FIG. 5 is a plan view showing terminals and connectors of the first coupler.

As shown in FIGS. 2 and 5, three terminal rods 54*a* through 54*c* are disposed in the plug 48 and extend in parallel with each other in a radial direction with respect to the annular member 46. The three terminal rods 54*a* through 54*c* provide respective contacts in three phases, i.e., U, V, and W phases. Respective sets of four connectors 16 through respective polygonal terminals 56*a* through 56*c* are connected to the terminal rods 54*a* to 54*c* (see FIG. 5). The remaining twelve connectors 16 are connected to a polygonal terminal 56*d*.

Figure 6:
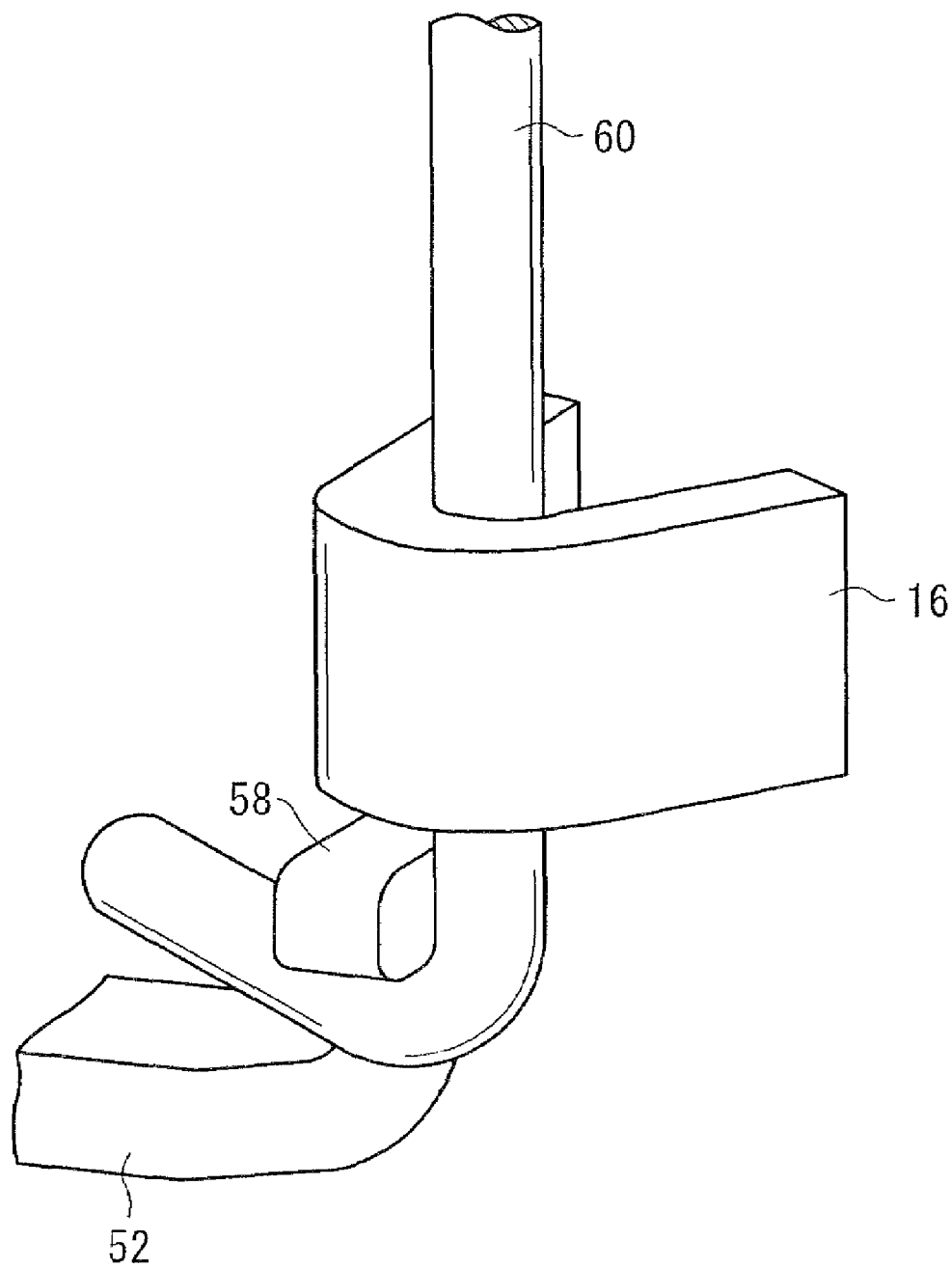
FIG. 6 is a fragmentary enlarged perspective view of one of the connectors of the first coupler shown in FIGS. 4 and 5.

As shown in FIG. 6, each of the bridges 52 is bent through an angle of about 90° and includes a finger 58 in the vicinity of a bent corner portion thereof. A lead 60 that extends from the electromagnetic coil 14 (see FIG. 2) is kept taut while engaging with the finger 58. Therefore, the lead 60 is held under tension.

Figure 7:
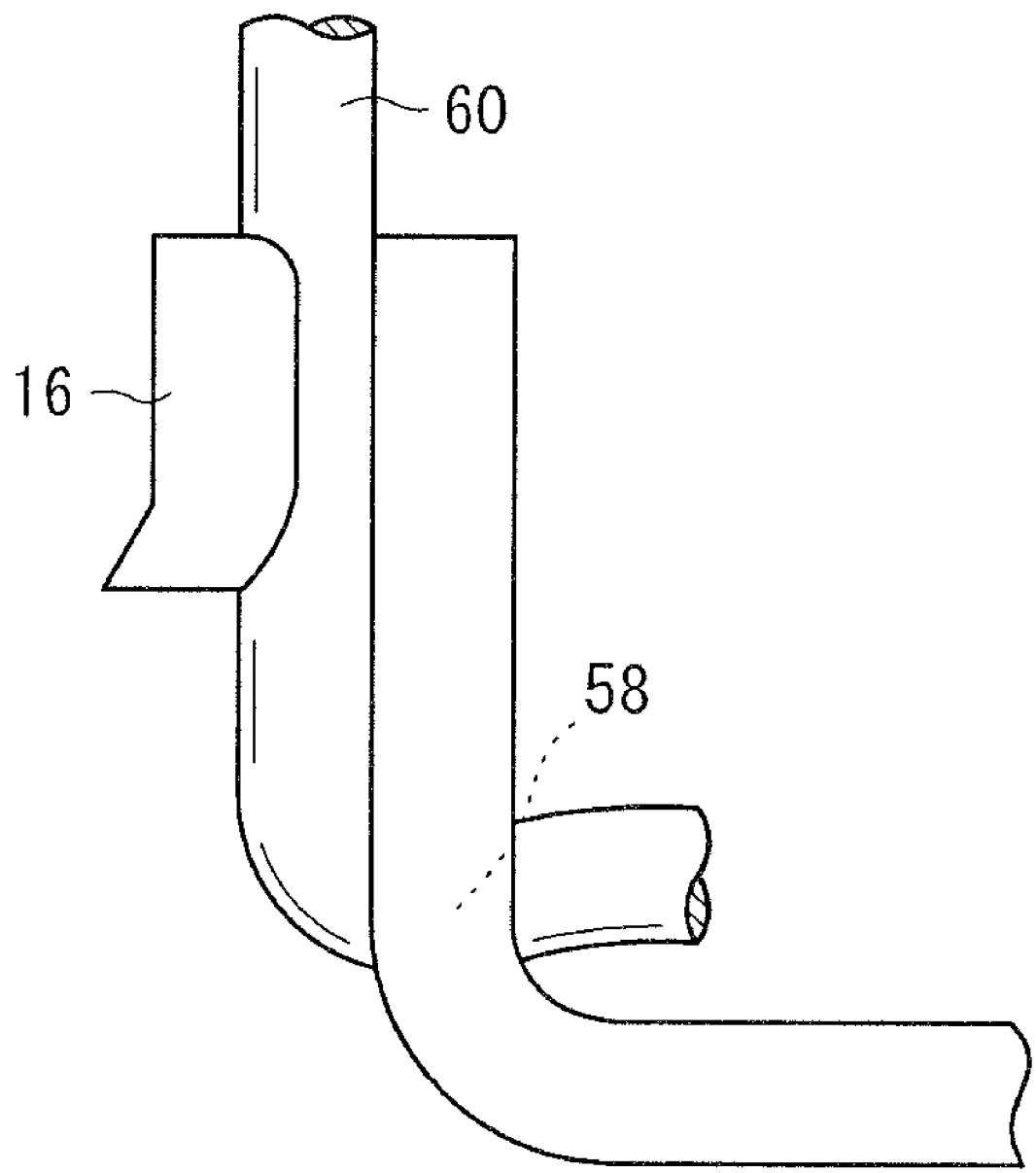
FIG. 7 is a fragmentary enlarged elevational view of the connector shown in FIG. 6.

The connector 16 has one end joined to the radial inner end of the bridge 52 and a substantially intermediate portion thereof, which is bent through an angle of about 300°, so that the connector 16 is substantially V-shaped. As shown in FIG. 7, the connector 16 has beveled corners on a surface thereof facing the lead 60. Stated otherwise, the area of the connector 16 held against the lead 60 is curved, and hence reduced stresses are applied to the lead 60 from the connector 16.

The lead 60 has a distal end, which is bent through an angle of about 90° in the vicinity of the connector 16. The lead 60 extends through the connector 16, where the bent distal end thereof engages with the finger 58 (see FIG. 6). The connector 16, which extends around the lead 60, is compressed (see FIG. 7) tightly around the lead 60 and then is joined to the lead 60 by means of electrodeposition.

As shown in FIG. 4, each set of two adjacent bridges 52 serves as a bridge pair 62. The two bridges 52 of each bridge pair 62 project from an inner wall surface of the annular member 46 in parallel with each other. In order to join the connectors 16 and the leads 60 to each other, two leads 60 may be joined to one bridge pair 62 by electrodeposition, and then the angle of the leads 60 is changed. In this way, although the leads 60 must be joined to the bridges 52 by means of electrodeposition a total of twenty-four times, the angles of the leads 60 need only be changed twelve times. Since the number of times that the angle of the leads 60 is changed is comparatively small, the tact time required to produce the brushless motor 10 can be shortened.

The first coupler 18 is fabricated in the following manner. First, as shown in FIG. 5, the terminal 56*a*, which is connected at one end thereof to the terminal rod 54*a* and also is connected at spaced positions to the connectors 16 by the bridges 52, is bent into a polygonal shape. Similarly, the terminals 56*b* and 56*c*, which are connected to the respective terminal rods 54*b* and 54*c*, are bent into a polygonal shape. The terminal 56*d*, which isn't connected to any terminal rod, also is bent into a polygonal shape. The polygonal terminals 56*a* through 56*d* are held closely together, such that the terminal rods 54*a* through 54*c* are disposed closely in parallel with each other and extend in the same direction.

The polygonal terminals 56*a* through 56*d*, which are held closely together, are housed in a guide member 64 (see FIG. 2), which is then set in a die. A molten resin material is poured into the die and cooled and solidified into the molded body 50, including the annular member 46 and the plug 48. In this manner, the first coupler 18 shown in FIG. 4 is produced.

The polygonal terminals 56*a* through 56*d* (see FIG. 5) thus formed exhibit less springback than if the terminals 56*a* through 56*d* were circular in shape. Accordingly, the polygonal terminals 56*a* through 56*d* have better dimensional accuracy.

In addition, the polygonal terminals 56*a* through 56*d*, which are held closely together, are less likely to be positionally displaced because, if one of the polygonal terminals 56*a* through 56*d* is positionally displaced, the vertexes thereof interfere with an adjacent one of the polygonal terminals 56*a* through 56*d*. It is thus easy to insert the polygonal terminals 56*a* through 56*d* into the guide member 64. Once the first coupler 18 has been completed, since the polygonal terminals 56*a* through 56*d* are encased within the molded body 50, the polygonal terminals 56*a* through 56*d* are securely protected against positional displacement, even when an automobile incorporating the brushless motor 10 therein vibrates while it is being driven.

Inasmuch as the terminals 56*a* through 56*d* are polygonal in shape and are encased within the molded body 50, the terminals 56*a* through 56*d* of the first coupler 18 are excellent in dimensional accuracy, easy to handle, resistant to vibrations, and well protected against positional displacement.

The electromagnetic coil 14 is housed in the casing 22 along an inner wall surface thereof (see FIG. 2). The main magnet 20 is supported on a magnet holder 66 that is fitted over a circumferential wall surface of the shaft 28 and faces radially toward the electromagnetic coil 14. When the shaft 28 rotates about its own axis, the magnet holder 66 and the main magnet 20 rotate around the shaft 28, thereby repetitively changing the relative position thereof with respect to the electromagnetic coil 14. The magnet holder 66 comprises a hollow tubular body having an open end, and further includes an inner wall surface spaced a predetermined distance from the circumferential wall surface of the shaft 28.

The shaft 28 includes an annular raised step 68, which is positioned in the center of the first coupler 18 adjacent to the first bearing 34. A wedge 70 is fitted over the shaft 28 in abutment against an end wall of the annular raised step 68. The wedge 70 includes an annular sleeve, which is press-fitted between the inner wall surface of the magnet holder 66 and the circumferential wall surface of the shaft 28, thereby securely positioning the magnet holder 66 onto the shaft 28.

The casing 22 includes a reduced-diameter portion 74 on one end thereof facing toward the second coupler 26. The reduced-diameter portion 74 has a smaller inside diameter than the remainder of the casing 22. The shaft 28 has another end thereof, remote from the end portion rotatably supported by the first bearing 34, and which is rotatably supported in the reduced-diameter portion 74 by a second bearing 76 retained therein.

The end portion of the shaft 28 that is rotatably supported by the first bearing 34 includes teeth 78, such as splines, which mesh in engagement with the teeth on a rotatable shaft (not shown) of an internal combustion engine that includes the cylinder head. The end of the shaft 28 rotatably supported by the second bearing 76 has a bottomed threaded hole 80 defined therein. An auxiliary magnet 84 is mounted on the end of the shaft 28 by a magnet holding screw 82, which is threaded into the bottomed threaded hole 80. As shown in FIG. 2, the auxiliary magnet 84 is positioned closely to the Hall ICs 24a through 24c disposed in the second coupler 26. The Hall ICs 24a through 24c serve to detect positions of the magnetic poles of the auxiliary magnet 84.

Figure 8:
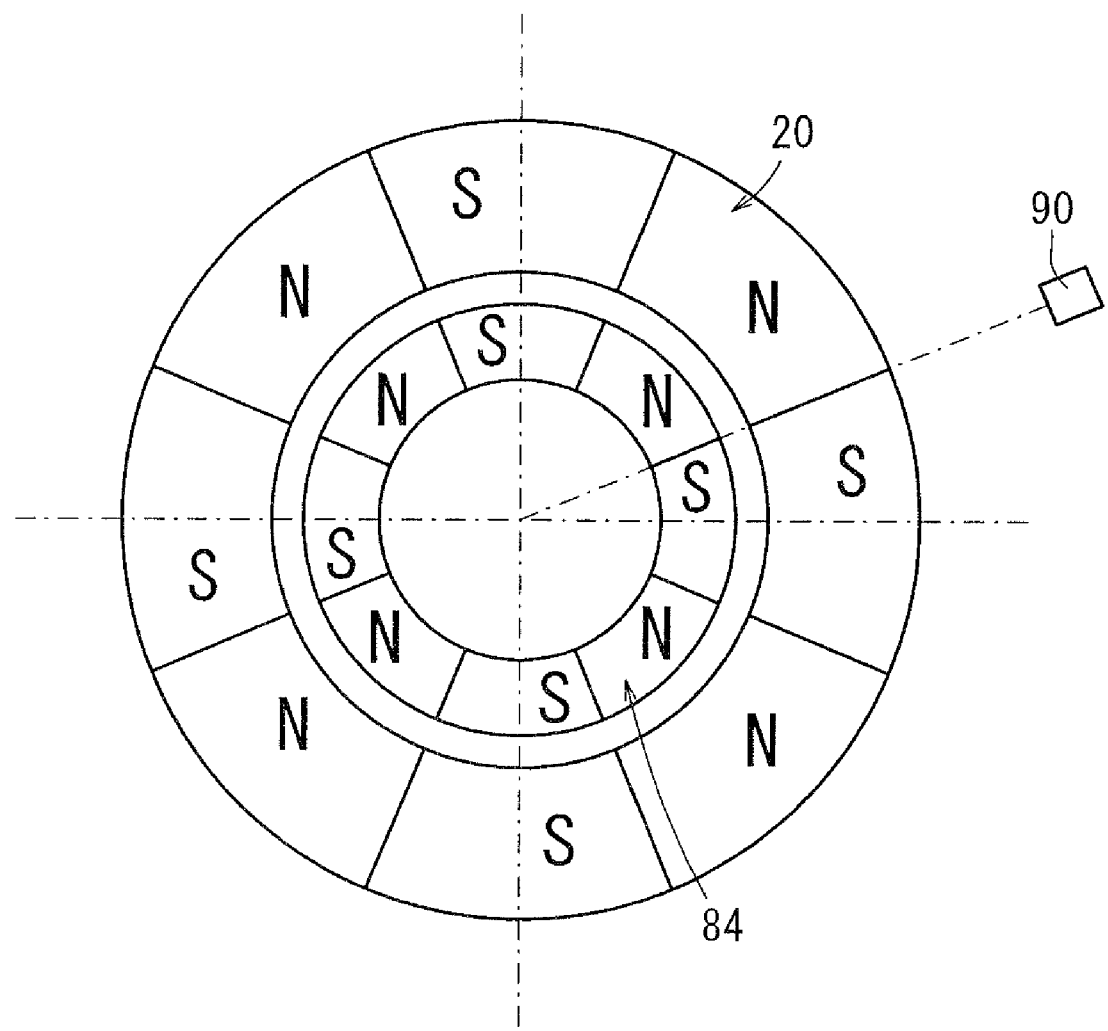
FIG. 8 is a schematic plan view showing the polarity and phase layout of main and auxiliary magnets of the brushless motor shown in FIG. 1.
Figure 9:
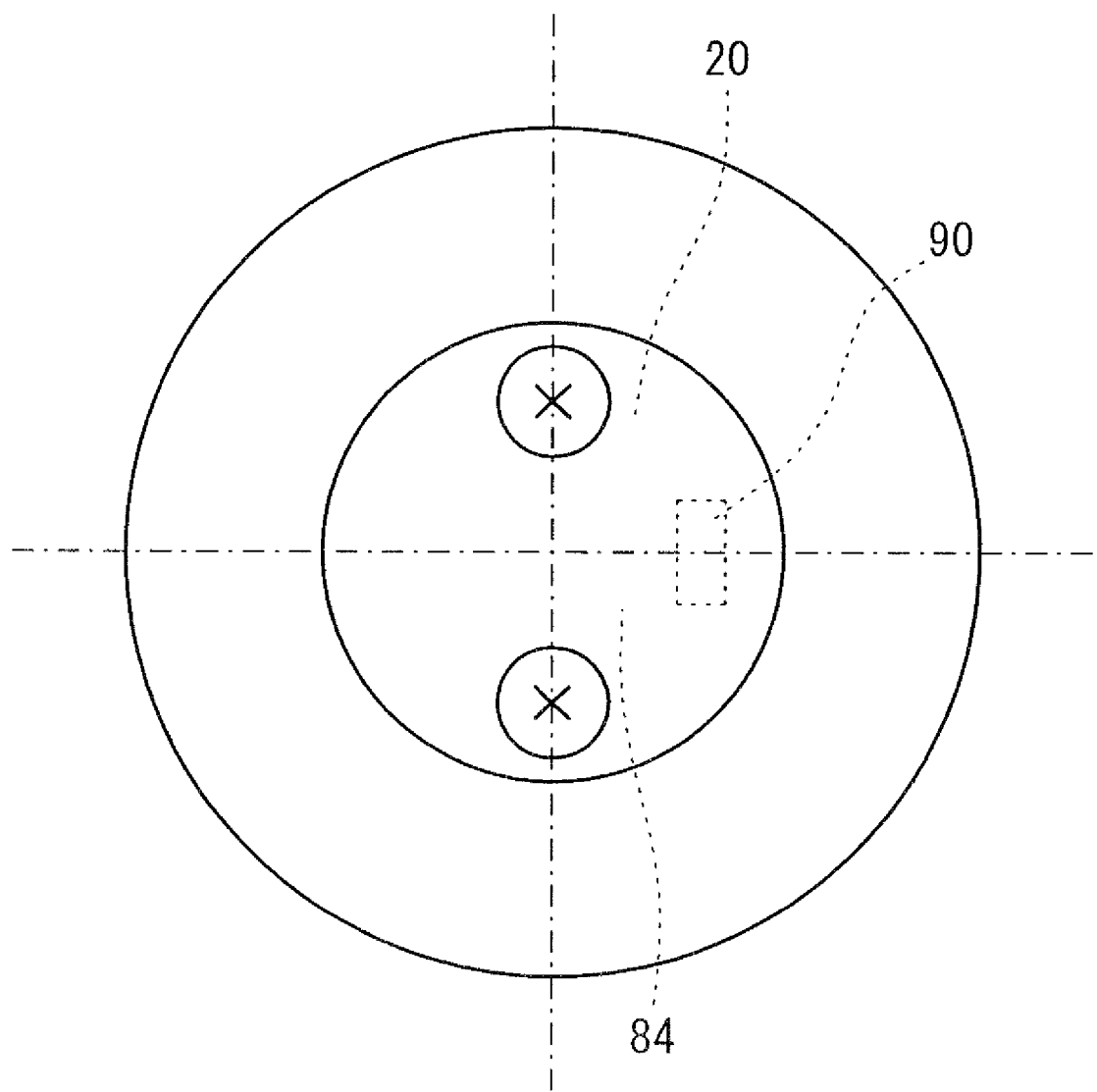
FIG. 9 is a plan view of the brushless motor shown in FIG. 1.

The polarities of the main magnet 20 and the auxiliary magnet 84 are illustrated schematically in FIG. 8. FIG. 8 is a plan view as viewed from the second coupler 26.

As shown in FIG. 8, the main magnet 20 and the auxiliary magnet 84 have magnetic poles with similar shapes, which are held in phase with each other. Therefore, it is not necessary to adjust the position of the sensor 90 in order to monitor polarity changing points of the auxiliary magnet 84, and hence, it is not necessary to provide an adjustment hole (oblong hole) for adjusting the position of the sensor 90 from a location outside of the brushless motor 10.

According to the present embodiment, in the process of manufacturing the brushless motor 10, the steps of making the adjustment hole and adjusting the position of the sensor 90 are dispensed with. As a result, the process of manufacturing the brushless motor 10 is simpler and results in higher production efficiency. Further, the cost of the brushless motor 10 is lower.

Figure 10:
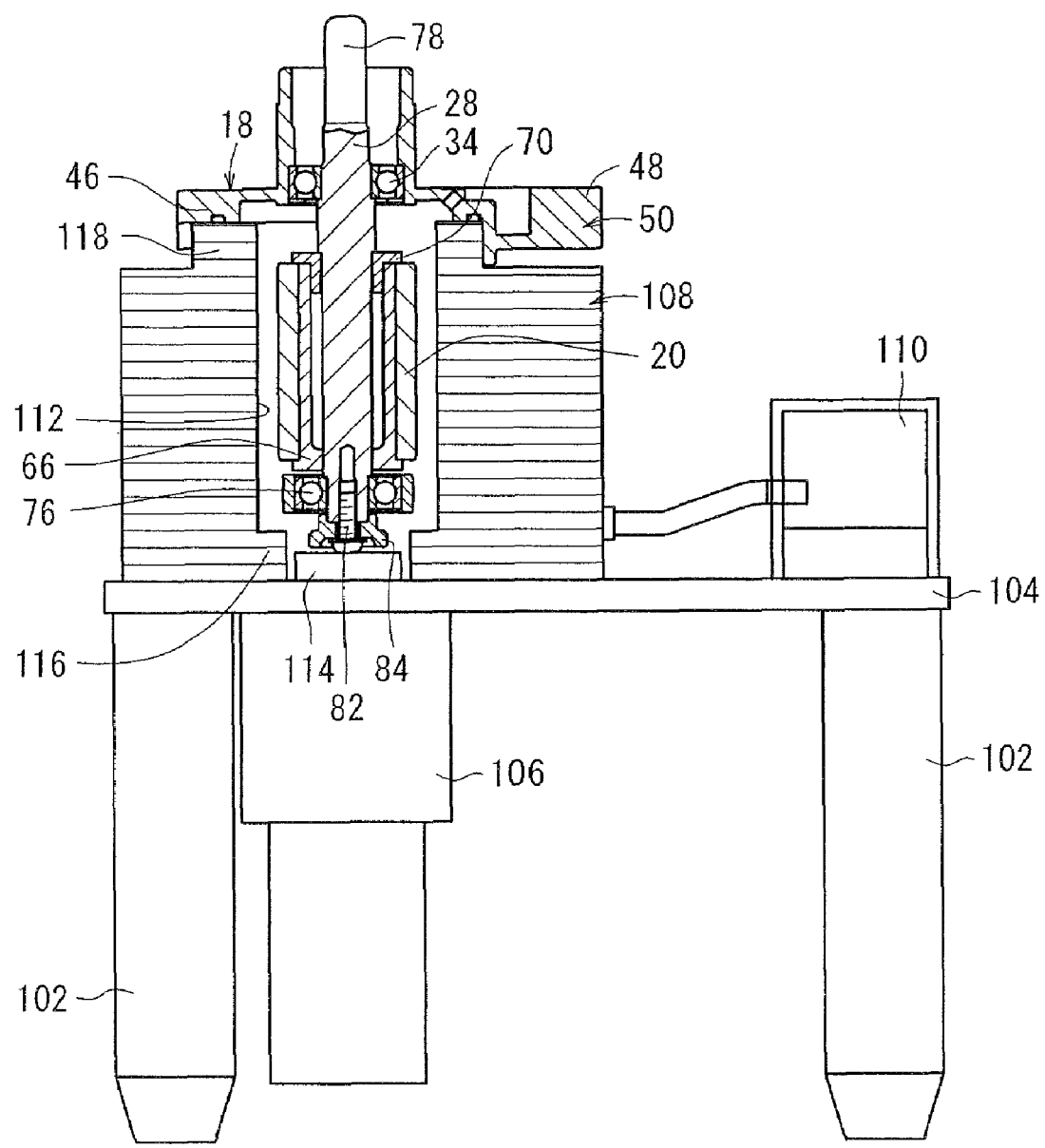
FIG. 10 is a front elevational view, partly in cross section, of a magnetizer utilized for magnetizing the main and auxiliary magnets.

The main magnet 20 and the auxiliary magnet 84 are brought into phase with each other by a magnetizer 100 shown in FIG. 10. As shown in FIG. 10, the magnetizer 100 comprises a base 104 having legs 102 mounted on a lower surface thereof, a pushing cylinder 106 mounted on the lower surface of the base 104 in parallel with the legs 102, and a magnetizing yoke 108 fixedly mounted on an upper surface of the base 104. A terminal box 110 is mounted on an upper surface of the base 104 in the vicinity of the magnetizing yoke 108. The magnetizing yoke 108 is energized to assume a magnetizing mode, or is deenergized so as to suspend the magnetizing mode, when a switch (not shown) disposed in the terminal box 110 is turned on or off.

The magnetizing yoke 108 has a vertical through hole 112 therein, defined by an inner peripheral wall surface of the magnetizing yoke 108. The pushing cylinder 106 includes a rod 114 that projects from the upper surface of the base 104 into the through hole 112. The inside diameter of a lower end portion of the magnetizing yoke 108 is reduced by an annular step 116, which projects radially inwardly from an inner side wall of the magnetizing yoke 108 into the through hole 112. The magnetizing yoke 108 has a reduced-diameter portion 118 on an upper end thereof. The outside diameter of the reduced-diameter portion is smaller than the remainder of the magnetizing yoke 108.

In order to magnetize the main magnet 20 and the auxiliary magnet 84, the main magnet 20 is mounted on the shaft 28 by the magnet holder 66, while the auxiliary magnet 84 is mounted on the shaft 28 by the magnet holding screw 82. The first coupler 18 also is mounted on the shaft 28. The shaft 28 then is inserted into the through hole 112 in the magnetizing yoke 108, with the auxiliary magnet 84 facing downward.

When the first coupler 18 is seated on the upper end face of the reduced-diameter portion 118, as shown in FIG. 10, the auxiliary magnet 84 is surrounded by the annular step 116, and the main magnet 20 is surrounded by a portion of the magnetizing yoke 108, which extends from above the annular step 116 to immediately below the reduced-diameter portion 118. The distance by which the main magnet 20 is spaced from the inner peripheral wall surface of the magnetizing yoke 108 is essentially the same as the distance by which the auxiliary magnet 84 is spaced from the inner peripheral wall surface of the annular step 116.

When the switch in the terminal box 110 is turned on, the magnetizing yoke 108 is energized so as to magnetize both the main magnet 20 and the auxiliary magnet 84 simultaneously. Since the distance between the main magnet 20 and the inner peripheral wall surface of the magnetizing yoke 108 is essentially the same as the distance between the auxiliary magnet 84 and the inner peripheral wall surface of the annular step 116, the main magnet 20 and the auxiliary magnet 84 are magnetized equally and develop essentially equal magnetic forces therein.

The magnetizing yoke 108 is formed with an integral structure, from the annular step 116 to the reduced-diameter portion 118. Therefore, the magnetizing yoke 108 produces a magnetic field in one direction from the annular step 116 toward the reduced-diameter portion 118. Accordingly, the main magnet 20 and the auxiliary magnet 84 are magnetized so as to produce polarities that are in phase with each other (see FIG. 8).

Briefly stated, since the main magnet 20 and the auxiliary magnet 84 are simultaneously magnetized by the same magnetizing yoke 108, the main magnet 20 and the auxiliary magnet 84 are magnetized with polarities that are in phase with each other. As a consequence, the steps of making the adjustment hole and of adjusting the position of the sensor 90 can be dispensed with in the process of manufacturing the brushless motor 10, as described above. The brushless motor 10 can thus be manufactured with increased production efficiency and at a lower cost.

After the main magnet 20 and the auxiliary magnet 84 have been magnetized, the switch in the terminal box 110 is turned off. The rod 114 of the pushing cylinder 106 is displaced upwardly, thereby pushing the shaft 28 upwardly out of the through hole 112 in the magnetizing yoke 108.

Figure 11:
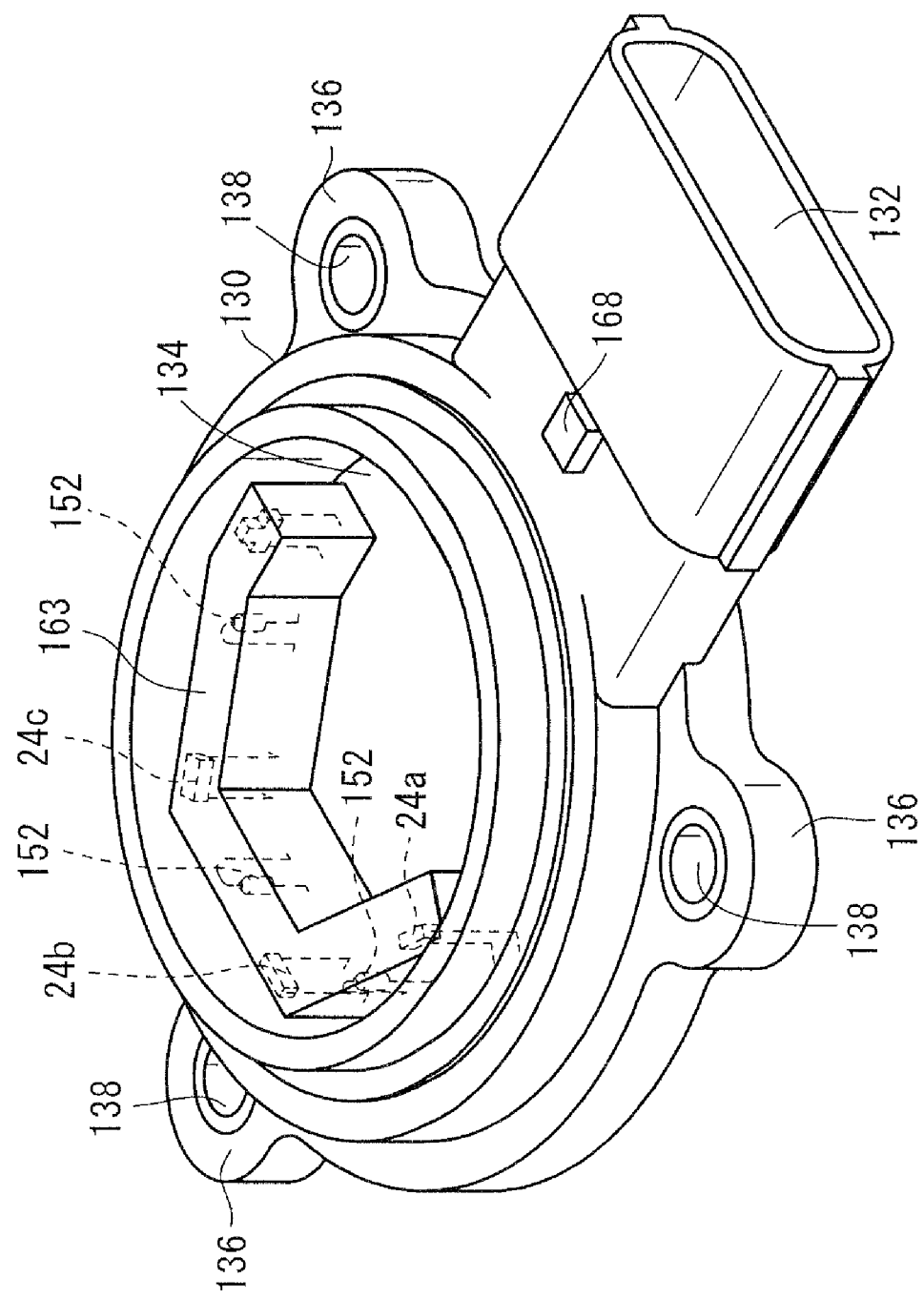
FIG. 11 is a perspective view of a second coupler of the brushless motor shown in FIG. 1.

As shown in FIG. 11, the second coupler 26 comprises a disk 130, which closes the open end of the casing 22, and a plug 132 integrally combined with an outer peripheral side wall of the disk 130. The disk 130 has a circular recess 134 defined therein. Hall ICs 24a through 24c, which are encased within a resin body as described below, are mounted on a ceiling surface of the circular recess 134.

Three equally angularly spaced screw seats 136 project radially outwardly from the outer peripheral side wall of the disk 130. The screw seats 136 have through holes 138 defined respectively therein. The second coupler 26 is fastened to the casing 22 by means of screws 140 (see FIGS. 1 and 2), which are threaded through the through hole 138 into respective threaded holes 142 defined in the end face of the casing 22.

Figure 12A:
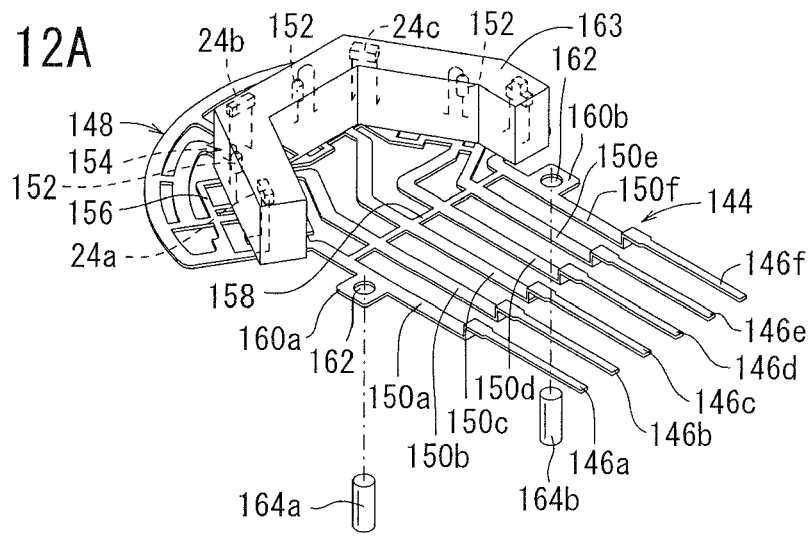
FIGS. 12A through 12C are perspective views that illustrate a sequence used for producing the second coupler.

As shown in FIG. 12A, six terminal bars 146a through 146f, which project into the plug 132, extend integrally from the bus bar 144 and are connected electrically to the Hall ICs 24a through 24c. Specifically, leads of the Hall ICs 24a through 24c are joined to the bus bar 144.

Figure 12B:
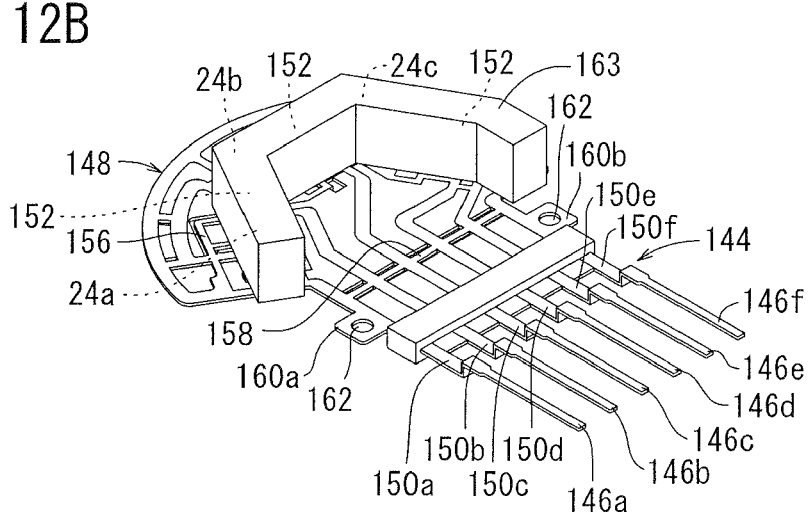
Figure 12C:
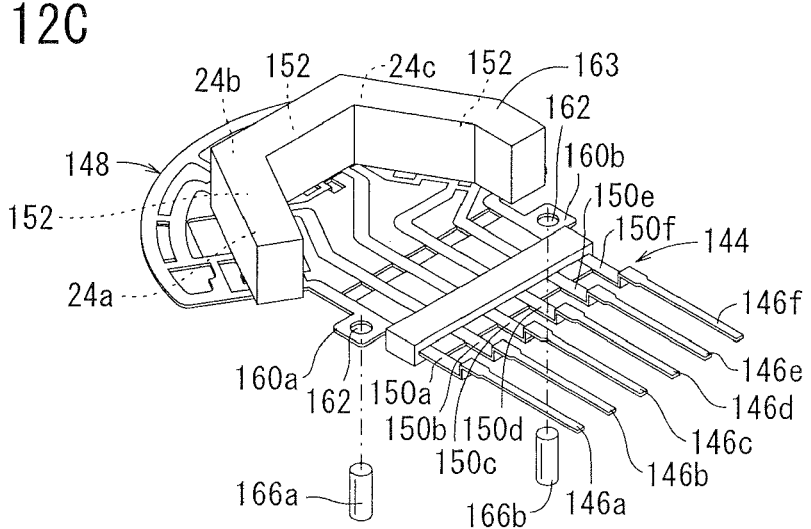

The second coupler 26 is fabricated according to the process shown in FIGS. 12A through 12C. First, the bus bar 144 shown in FIG. 12A is prepared. The bus bar 144 comprises an arcuate portion 148, six straight arms 150a through 150f extending straight from one end of the arcuate portion 148, and the terminal bars 146a through 146f, which extend respectively from the straight arms 150a through 150f. The arcuate portion 148 supports mounts 154 thereon, which are joined to the Hall ICs 24a through 24c, capacitors 152, etc. The arcuate portion 148 includes a first support frame 156 interconnecting the mounts 154. The straight arms 150a through 150f are interconnected integrally by a second support frame 158, which extends perpendicularly to the straight arms 150a through 150f.

Tabs 160a, 160b project outwardly from outer side surfaces, respectively, of the straight arms 150a, 150f positioned at opposite ends of the group of straight arms 150a through 150f. The tabs 160a, 160b have through holes 162 defined therein.

The Hall ICs 24a through 24c, capacitors 152, etc., are encased within a resin body 163, which is made of a resin material such as epoxy resin or the like. The Hall ICs 24a through 24c, capacitors 152, etc., have leads joined to the mounts 154 at given positions thereon. The three Hall ICs 24a through 24c are installed onto the mounts 154.

The bus bar 144 is set in a die. At this time, as shown in FIG. 12A, positioning pins 164a, 164b are inserted into the respective through holes defined in the tabs 160a, 160b, thereby securely positioning the bus bar 144.

With the bus bar 44 thus positioned, a molten resin material, such as polypropylene sulfide or the like, is poured into the die. Since the bus bar 144 is securely positioned in place by the positioning pins 164a, 164b, the bus bar 144 is prevented from becoming positionally displaced under the pressure of the poured molten resin material. Accordingly, the molten resin material is supplied to the bus bar 144 only at a predetermined position thereon.

When the molten resin material is cooled and solidified after elapse of a certain period of time, as shown in FIG. 12B, the resin intervenes between the mounts 154 and between the straight arms 150a through 150f. Resin fragments are removed from around the leads of the Hall ICs 24a through 24c and the capacitors 152, and unwanted portions of the first support frame 156 and the second support frame 158 are cut off from the bus bar 144, as shown in FIG. 12C. Thus, the Hall ICs 24a through 24c become insulated from each other. This process will be referred to as a primary molding process.

The bus bar 144 is then set into another die. At this time as well, as shown in FIG. 12C, positioning pins 166a, 166c are inserted into the respective through holes defined in the tabs 160a, 160b, thereby securely positioning the bus bar 144.

A molten resin material, such as polypropylene sulfide or the like, is poured into the die. Because the bus bar 144 is securely positioned, the bus bar 144 is prevented from becoming positionally displaced under the pressure of the poured molten resin material.

The molten resin material becomes cooled and solidified, thereby forming a housing that includes the disk 130, which encases the bus bar 144 and the plug 132, surrounding the terminal bars 146a through 146f. This process will be referred to as a secondary molding process. In this manner, the second coupler 26 shown in FIG. 11 is produced.

As described above, the primary molding process is performed to close the holes in the bus bar 144 after the devices including the Hall ICs 24a through 24c have been joined to the bus bar 144, whereas the second molding process is performed to form the disk 130 and the plug 132. Accordingly, the second coupler 26 is produced with the devices positioned accurately inside of the second coupler 26. According to the present embodiment, the positional accuracy of the devices is extremely high because the bus bar 144 is securely positioned by the positioning pins 164a, 164b, 166a, 166b in both the primary molding process and the secondary molding process.

The second coupler 26 has a protrusion 168 formed on the disk 130 in the vicinity of the plug 132. When the second coupler 26 is mounted on the casing 22, the protrusion 168 is inserted into a recess (not shown), which is defined in the end face of the casing 22, thereby securely positioning the second coupler 26 with respect to the casing 22.

As shown in FIG. 2, the first coupler 18 is sealed with respect to the holder base 12 and the casing 22 by O-rings 170, 172, and the second coupler 26 is sealed with respect to the casing 22 by an O-ring 174.

The brushless motor 10, which is constructed according to the present embodiment in the foregoing manner, operates as follows.

The brushless motor 10 is mounted onto an internal combustion engine with the holder base 12 thereof facing toward the cylinder head of the engine. Specifically, screws (not shown) are inserted through the through holes 44a through 44c (see FIG. 1) defined in the wings 42 of the holder base 12, and the screws are threaded into respective threaded holes provided in the cylinder head. The teeth 78 (see FIG. 2) of the shaft 28 are held in mesh with teeth on a rotatable shaft of the internal combustion engine (not shown).

When the internal combustion engine operates, as the automobile is driven, the internal combustion engine vibrates, and the vibrations of the internal combustion engine are transmitted to the brushless motor 10.

As described above, heads of the screws 40, which are threaded into the threaded holes 38a through 38c, face toward the cylinder head, such that the screw holes 36a through 36c are closed by the cylinder head. Therefore, even if the screws 40 become loosened due to vibrations applied thereto over prolonged periods of time, the screws 40 are prevented from becoming dislodged from the holder base 12.

Stated otherwise, the holder base 12 and the casing 22 remain reliably coupled to each other over time. Thus, the brushless motor 10 is highly reliable in operation over a prolonged period of time.

Since the heads of the screws 40 face toward the cylinder head, no screw seats are required that project from the casing 22. Therefore, the width of the casing 22 is prevented from becoming unduly large in size.

As shown in FIG. 6, the leads 60 of the electromagnetic coil 14 are kept taut while engaging the fingers 58 in the vicinity of the connectors 16 of the first coupler 18. Even when the internal combustion engine vibrates, the leads 60 are resistant to disengagement from the connectors 16.

Furthermore, since the corners of the connector 16 are beveled on surfaces thereof that face the leads 60 (see FIG. 7), the leads 60 are prevented from becoming broken at portions which are held against the beveled corners of the connectors 16.

The same magnetic poles of the main and auxiliary magnets 20, 84 are held in phase with each other, and the Hall ICs 24*a* through 24*c* are disposed accurately in given positions in the second coupler 26. In addition, the protrusion 168 provided on the disk 130 in the vicinity of the plug 132 is inserted into a recess (not shown) defined in the end face of the casing 22, thereby securely positioning the second coupler 26 with respect to the casing 22. Accordingly, the brushless motor 10 can be kept in operation highly reliably over a prolonged period of time.

According to the present embodiment, as described above, the brushless motor 10 is both small in size and excellent in reliability. Since the brushless motor 10 is small in size, the freedom with which the brushless motor 10 can be laid out within an internal combustion engine is increased.

Since the magnet holder 66 comprises a hollow tubular body, the magnet holder 66 is lightweight, thereby allowing the shaft 28 to start rotating quickly from a stopped condition. The lightweight magnet holder 66 also reduces inertia at a time when the shaft 28 stops rotating. Stated otherwise, the shaft 28 can both start and stop rotating within a short period of time.

The brushless motor 10 according to the present embodiment has a low power requirement and a high response speed.

The brushless motor 10 according to the illustrated embodiment is designed for use in an internal combustion engine. However, the principles of the present invention are not restricted to such an application, but may be applied in other fields as well.

Although a certain preferred embodiment of the present invention has been shown and described in detail, it should be understood that various changes and modifications may be made to the embodiment without departing from the scope of the invention as set forth in the appended claims.

What is claimed is:

1. A brushless motor comprising:
   a shaft;
   a magnet held on said shaft;
   a plurality of electromagnetic coils surrounding said magnet, each of the electromagnetic coils including a pair of leads; and
   a coupler having a plurality of pairs of connectors joining said leads, a number of the electromagnetic coils being the same as a number of the pairs of connectors;
   wherein said coupler comprises an annular member and a plug coupled to said annular member and surrounding terminal rods;
   said connectors are mounted on respective bridges that project radially inwardly from an inner wall surface of said annular member and are connected to said terminal rods; and
   said bridges are provided as pairs of adjacent bridges, wherein the adjacent bridges in each of said pairs extend parallel to each other and have one pair of connectors.

2. A brushless motor according to claim 1, further comprising:
   a plurality of fingers mounted respectively on said bridges in engagement with said leads, respectively.

3. A brushless motor according to claim 2, wherein each of said connectors includes a beveled corner on a surface thereof that is held against one of said leads.

4. A brushless motor according to claim 1, further comprising:
   a holder by which said magnet is held on said shaft;
   said holder having a through hole defined therein, which extends from one bottom surface thereof to another bottom surface thereof, said shaft extending through said through hole;
   said through hole having an inner wall surface spaced from a peripheral side surface of said shaft; and
   a wedge fitted into said through hole on one of said bottom surfaces of said holder and including a portion held against an inner wall surface of said holder and the peripheral side surface of said shaft.

5. A brushless motor according to claim 1, wherein said coupler includes a plurality of terminals electrically connected to said connectors, said terminals being polygonal in shape.

6. A brushless motor according to claim 5, further comprising:
   a molded body in which said terminals are encased.

7. A brushless motor according to claim 1, further comprising:
   a second coupler spaced from said coupler along said shaft;
   a second magnet; and
   a plurality of magnetic pole position detectors for detecting positions of magnetic poles of said second magnet, said magnetic pole position detectors being disposed in said second coupler;
   said second coupler including a bus bar, which is covered by a first resin body;
   said magnetic pole position detectors having respective terminals connected to said bus bar, and being covered by a second resin body.

* * * * *